United States Patent
Kasatani

(10) Patent No.: US 7,952,736 B2
(45) Date of Patent: May 31, 2011

(54) RECEIVED DOCUMENT INPUT AND OUTPUT DEVICE AND INPUT AND OUTPUT METHOD OF RECEIVED DOCUMENT

(75) Inventor: Kiyoshi Kasatani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 950 days.

(21) Appl. No.: 11/509,734

(22) Filed: Aug. 25, 2006

(65) Prior Publication Data

US 2007/0046988 A1 Mar. 1, 2007

(30) Foreign Application Priority Data

Aug. 31, 2005 (JP) ................................. 2005-251289

(51) Int. Cl.
*G06F 3/12* (2006.01)

(52) U.S. Cl. ..................... 358/1.15; 358/1.16; 358/1.17; 358/1.13; 358/1.14; 709/202; 709/203

(58) Field of Classification Search ........ 358/1.13–1.18, 358/1.11–1.12; 709/202, 203, 224
See application file for complete search history.

(56) References Cited

U.S. PATENT DOCUMENTS

| | | | | |
|---|---|---|---|---|
| 6,240,445 | B1 * | 5/2001 | Kumar et al. ................. | 709/206 |
| 6,594,351 | B1 * | 7/2003 | Bhogal et al. ............ | 379/100.01 |
| 6,791,703 | B1 * | 9/2004 | Maeda et al. ................. | 358/1.15 |
| 7,209,250 | B2 * | 4/2007 | Nakao .......................... | 358/1.15 |
| 2003/0048470 | A1 * | 3/2003 | Garcia ......................... | 358/1.15 |
| 2003/0234957 | A1 * | 12/2003 | Ohara ........................ | 358/1.15 |
| 2004/0139164 | A1 * | 7/2004 | Kanaya ........................ | 709/206 |
| 2005/0012953 | A1 | 1/2005 | Fujishige et al. | |
| 2005/0024674 | A1 | 2/2005 | Fujishige et al. | |
| 2005/0062990 | A1 | 3/2005 | Fujishige et al. | |
| 2005/0062991 | A1 | 3/2005 | Fujishige et al. | |
| 2005/0066274 | A1 | 3/2005 | Fujishige et al. | |
| 2005/0091325 | A1 | 4/2005 | Kuwana et al. | |
| 2005/0097020 | A1 | 5/2005 | Nomura et al. | |
| 2005/0166155 | A1 * | 7/2005 | Bridges et al. ................ | 715/752 |
| 2005/0188226 | A1 | 8/2005 | Kasatani | |
| 2005/0190236 | A1 * | 9/2005 | Ishimoto ........................ | 347/55 |

(Continued)

FOREIGN PATENT DOCUMENTS

JP 09-233283 9/1997

(Continued)

OTHER PUBLICATIONS

Rejection Notice from the Japanese Patent Office for counterpart Japanese application JP 2005-251289, dated Apr. 20, 2010 (without translation).

*Primary Examiner* — Chan S Park
(74) *Attorney, Agent, or Firm* — Harness, Dickey & Pierce, P.L.C.

(57) ABSTRACT

A received document input and output device connected to a network and using a plurality of communication protocols, the document input and output device communicating documents in various data forms with a plurality of information devices, includes a storing part configured to store the documents received via a communication part; a printing part configured to print the documents; a setting part configured to set management information; and a periodic implementation part configured to control the parts processing the document based on the management information and an output of a clock part configured to count day and time.

17 Claims, 14 Drawing Sheets

U.S. PATENT DOCUMENTS

| | | |
|---|---|---|
| 2005/0195446 A1 | 9/2005 | Kasatani |
| 2005/0210031 A1 | 9/2005 | Kasatani |
| 2005/0219640 A1 | 10/2005 | Kasatani |
| 2006/0101137 A1* | 5/2006 | Suto .............................. 709/223 |
| 2006/0227368 A1* | 10/2006 | Hong ........................... 358/1.15 |

FOREIGN PATENT DOCUMENTS

| | | |
|---|---|---|
| JP | 2000-174959 | 6/2000 |
| JP | 2003-060877 | 2/2003 |
| JP | 2004-356822 | 12/2004 |
| JP | 2005-014377 | 1/2005 |
| JP | 2005-025390 | 1/2005 |
| JP | 2005-025541 | 1/2005 |
| JP | 2005-025544 | 1/2005 |
| JP | 2005-027067 | 1/2005 |
| JP | 2005-031959 | 2/2005 |
| JP | 2005-031961 | 2/2005 |
| JP | 2005-049972 | 2/2005 |
| JP | 2005-049985 | 2/2005 |
| JP | 2005-051377 | 2/2005 |
| JP | 2005-085069 | 3/2005 |
| JP | 2005-085144 | 3/2005 |

* cited by examiner

FIG.7

MANAGER SETTING INFORMATION

<MANAGEMENT SETTING TABLE>
(1) EXTERNAL DEVICE IDENTIFICATION: YES
(2) PRIORITY IDENTIFICATION SETTING: FIRST = FIRST EXTERNAL DEVICE, SECOND = INDIVIDUAL MENU DEVICE
(3) FIRST EXTERNAL DEVICE IDENTIFICATION: YES
(4) FIRST EXTERNAL DEVICE IDENTIFICATION SETTING: TYPE = WINDOWS (REGISTERED TRADEMARK) SERVER, DOMAIN NAME = YES, IP ADDRESS = YES
(5) SECOND EXTERNAL DEVICE IDENTIFICATION: YES
(6) SECOND EXTERNAL DEVICE IDENTIFICATION SETTING: TYPE = MULTI FUNCTION PROCESSING MACHINE, DOMAIN NAME = NO, IP ADDRESS = NO
(7) AUTOMATIC REGISTRATION IN INDIVIDUAL MENU
(8) INDIVIDUAL MENU PASSWORD IS AUTOMATICALLY RENEWED
(9) LOG-IN BY ONLY INDIVIDUAL MENU IDENTIFICATION WHEN EXTERNAL SERVER CONNECTION HAS FAILED: YES
(10) INDIVIDUAL MENU AUTOMATIC DELETION SETTING: AUTOMATIC DELETION=YES, STORING TIME = 7 DAYS, WARNING INDICATION = YES
(11) INITIAL VALUE USER OF INDIVIDUAL REGISTRATION SETTING INFORMATION

FIG.8

INDIVIDUAL SETTING INFORMATION

<INDIVIDUAL SETTING TABLE>
(1) KANA WRITING: RICOH TARO
(2) NAME: RICOH TARO
(3) BELONGING TO: DEVELOPING BUSINESS PART
(4) INDIVIDUAL MENU IDENTIFICATION INFORMATION
(5) FIRST EXTERAL DEVICE IDENTIFICATION INFORMATION
(6) SECOND EXTERAL DEVICE IDENTIFICATION INFORMATION
(7) INDIVIDUAL MENU AUTOMATIC DELETION: PERMIT
(8) INDIVIDUAL MENU AUTOMATIC DELETION SETTING STORING AREA:
    AUTOMATIC DELETION = YES, STORING DAYS: 3 DAYS
(9) FUNCTION LIMITATION INFORMATION
(10) REGISTRATION ADDRESS INFORMATION: NAME = HOME DIRECTLY, NETWORK PASS = YES
(11) COMMON MEDIA INFORMATION: NAME = HOME DIRECTLY, REGISTRATION ADDRESS = HOME DIRECTLY
(12) NEWEST USING STATE STORING AREA

RECEIVED DOCUMENT INPUT AND OUTPUT DEVICE AND INPUT AND OUTPUT METHOD OF RECEIVED DOCUMENT

BACKGROUND OF THE INVENTION

1. Field of the Invention

The present invention relates to received document input and output devices and inputting and outputting methods of received documents, and more particularly, a received document input and output device, the document input and output device being connected to a network and using plural communication protocols, the document input and output device communicating documents in various data forms to and from plural information devices, and an inputting and outputting method of a received document.

2. Description of the Related Art

Recently and continuingly, a network communication system having a received document input and output device, the received document input and output device being connected to a network and using plural communication protocols, the document input and output device communicating documents in various data forms to and from plural information devices, has been developed.

In such a network communication system, various application services wherein a received document input and output device is used as a core are provided. For example, a document image read out or data made by an information device is sent to a designated address by e-mail, sent by a facsimile, or file-transferred to another information device. Information written in a received e-mail or an image in a file attached to the e-mail is recorded and output, sent to a designated facsimile, or file-transferred to the information device. Storing management of the data sent to the device is performed. See Japanese Laid-Open Patent Application Publication No. 2004-356822, for example.

However, plural information devices are connected to the received document input and output device via the network having the above-discussed structure. A document file such as an e-mail or facsimile sent or received by the received document input and output device is provided to an opponent (user) via various communication parts or ways. In a case of, especially, facsimile transmission, the facsimile is sent and printed for the convenience of the opponent. Thus, there is a problem of confidentiality of information.

SUMMARY OF THE INVENTION

Accordingly, embodiments of the present invention may provide a novel and useful received document input and output device and inputting and outputting method of a received document.

More specifically, the embodiments of the present invention may provide a document input and output device and an inputting and outputting method of a received document, whereby the file can be properly sent and received to or from the information devices and information can be used in a paperless state or under confidentiality.

One aspect of the present invention may be to provide a A received document input and output device connected to a network and using a plurality of communication protocols, the document input and output device communicating documents in various data forms with a plurality of information devices, including a storing part configured to store the documents received via a communication part; a printing part configured to print the documents; a setting part configured to set management information; and a periodic implementation part configured to control the parts processing the document based on the management information and an output of a clock part configured to count day and time.

It may be also the aspect of the present invention to provide a received document input and output device connected to a network and using a plurality of communication protocols, the document input and output device communicating documents in various data forms with a plurality of information devices, including storing means for storing the documents received via communication means; printing means for printing the documents; setting means for setting management information; and periodic implementation means for controlling the means for processing the document based on the management information and an output of clock means for counting day and time.

It may be also the aspect of the present invention to provide an inputting and outputting method of received documents, comprising the steps of: storing the documents received via a communication part; printing the documents; setting management information; and controlling the parts processing the documents based on the management information and an output of counted day and time.

According to the above-mentioned invention, it is possible to provide the document input and output device and the inputting and outputting method of a received document, whereby the file can be properly sent and received to or from the information devices and information can be used in a paperless state or under confidentiality.

More specifically, the document received by the communication part connected to the network can be efficiently used by transferring or printing processes based on management information of a periodic implementation part. In addition, it is possible to protect the confidentiality by not leaving output of the document whose schedule is managed and which is received by the facsimile.

Other objects, features, and advantages of the present invention will become more apparent from the following detailed description when read in conjunction with the accompanying drawings.

BRIEF DESCRIPTION OF THE DRAWINGS

FIG. 7 is a view showing a management setting table of setting information for a manager;

FIG. 8 is a view showing an individual setting table of individual setting information;

DETAILED DESCRIPTION OF THE PREFERRED EMBODIMENTS

A description of the present invention is now given, with reference to FIG. 1 through FIG. 11, including embodiments of the present invention.

The following embodiment of the present invention is an example where the present invention is applied to so-called digital color multifunction processing machine where a copying function, facsimile function, printing function, scanner function, function for providing an input image (a document image read out by the scanner function or an image input by the printing function or the facsimile function), and others, are combined.

Figure 1:
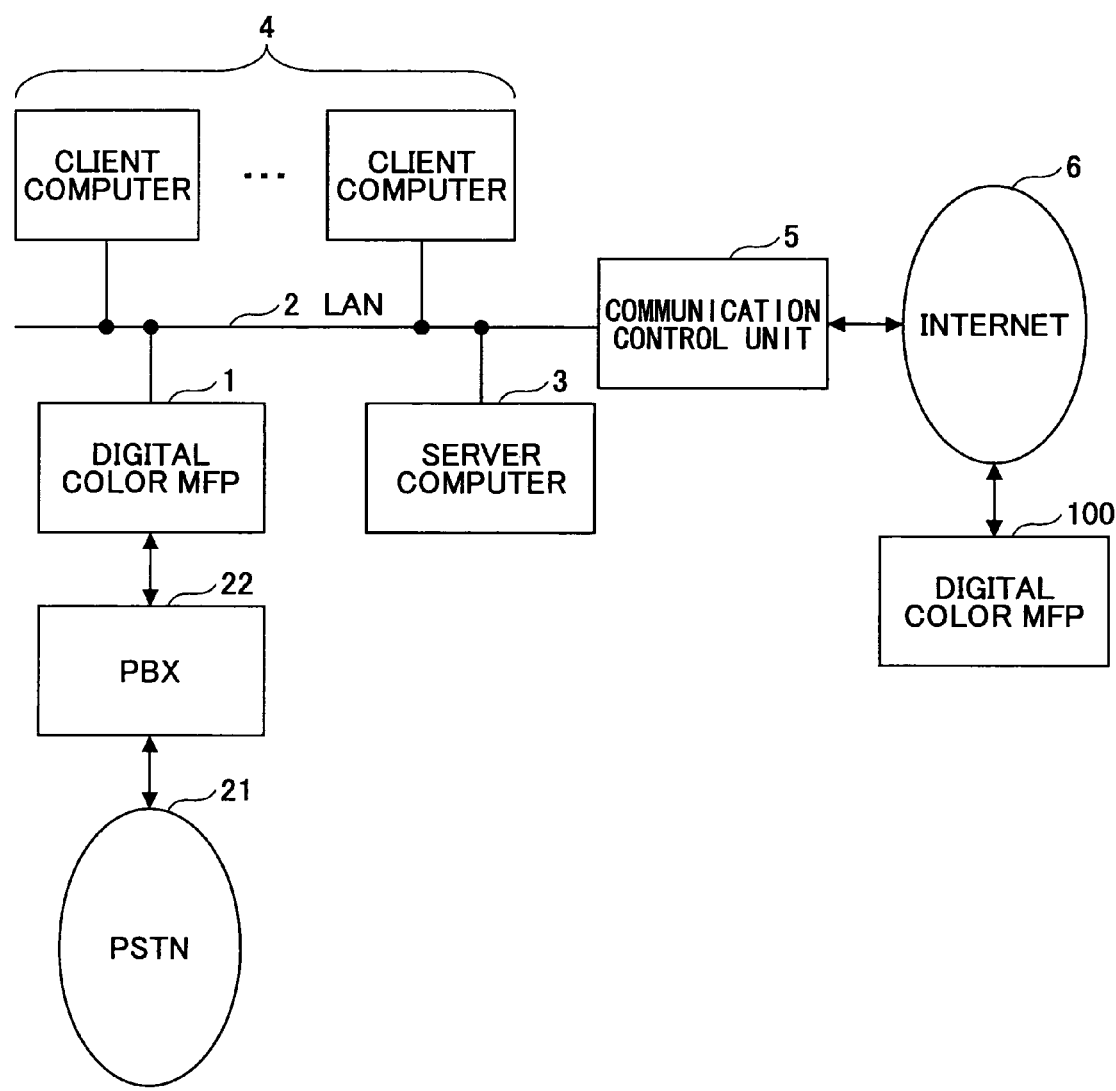
FIG. 1 is a system structural view including a digital color multifunction processing machine of an embodiment of the present invention.

FIG. 1 is a system structural view including a digital color multifunction processing machine of an embodiment of the present invention.

As shown in FIG. 1, in the embodiment of the present invention, a system having the following structure is assumed. A server computer 3 and plural client computers 4 are connected to a digital color multifunction processing machine 1 that is an information processing system via a LAN (Local Area Network) 2 that is a communication network.

The server computer 3 implements various kinds of information processes. For example, the server computer 3 supports FTP or HTTP protocol or realizes a function of a Web server or DNS server (Domain Name Server).

In other words, in this system, an environment where an image processing function of the digital color multifunction processing machine 1 such as an image input function (scanner function), image output function (printing function), image storing function, and others, can be jointly shared on the LAN 2.

Such a system is connected to the Internet 6 via a communication control unit 5 so that data communication between this system and an external environment can be performed via the Internet 6. In addition a digital color multifunction processing machine 100 is provided on the Internet 6. The digital color multifunction processing machine 100 has the same function as the digital color multifunction processing machine 1.

While a router, exchange, modem, DSL modem, or the like is normal as the communication control unit 5, it should be capable of TCP/IP communications as a minimum. In addition, the LAN 2 is not limited to wire communications but may use wireless communication (infrared, electromagnetic wave, or the like). An optical fiber may be used for the LAN 2.

Next, details of the digital color multifunction processing machine 1 are discussed. The explanation of the digital color multifunction processing machine 1 is, of course, applied to the digital color multifunction processing machine 100.

Figure 2:
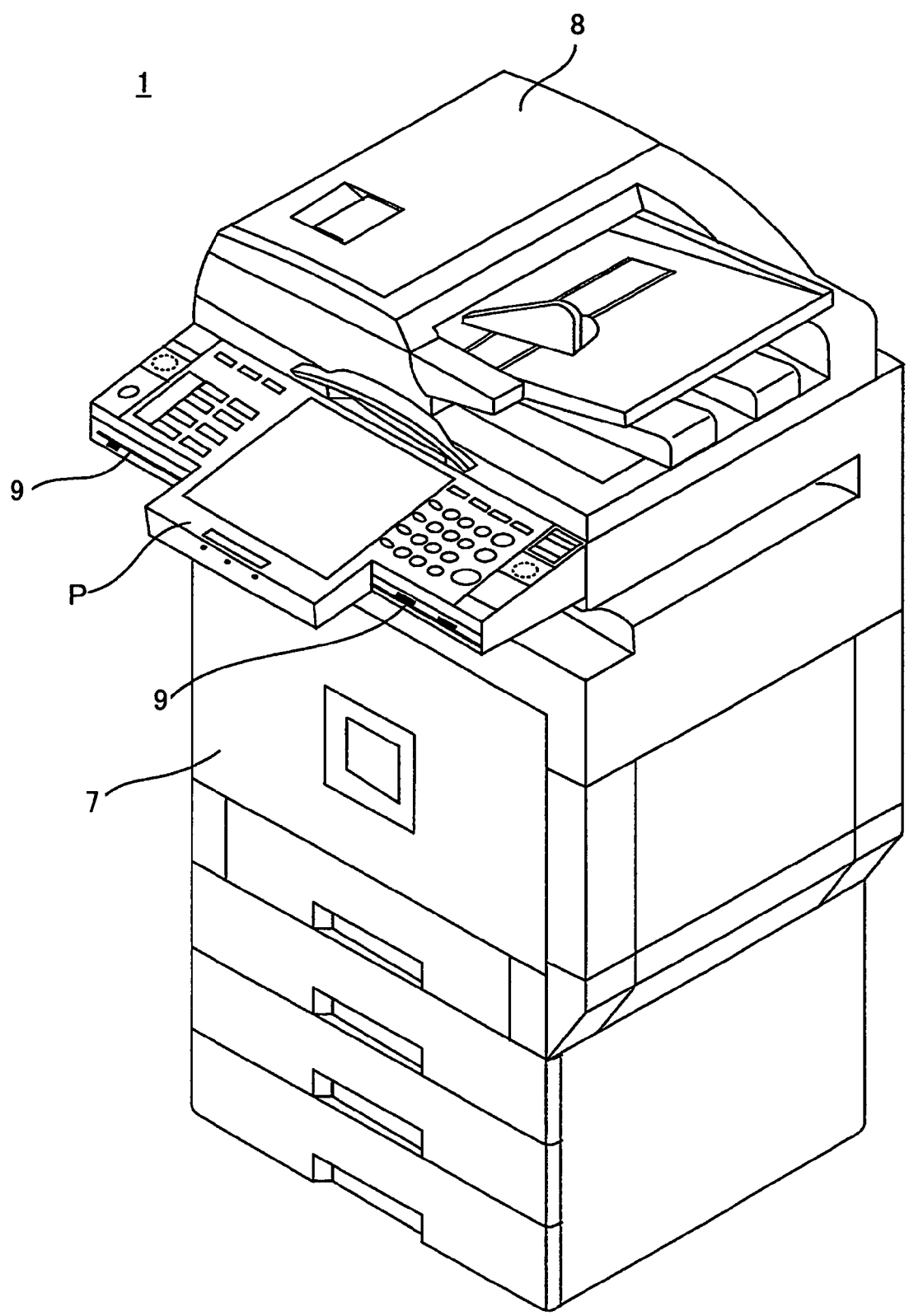
FIG. 2 is a schematic perspective view of the digital color multifunction processing machine.
Figure 3:
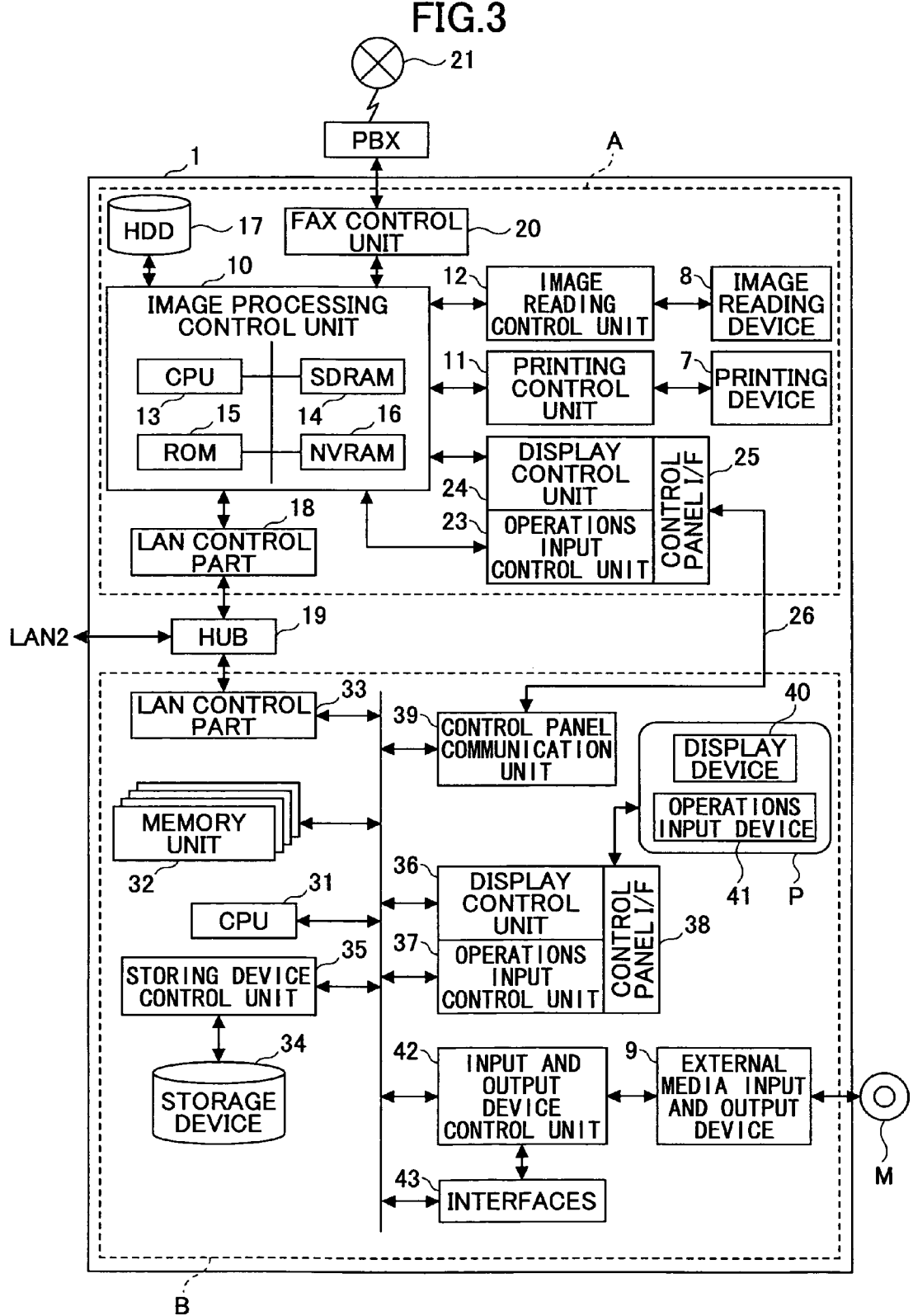
FIG. 3 is a block diagram showing electric connections of parts of the digital color multifunction processing machine.

Here, FIG. 2 is a schematic perspective view of the digital color multifunction processing machine 1. FIG. 3 is a block diagram showing electric connections of parts of the digital color multifunction processing machine 1.

As shown in FIG. 2, in the digital color multifunction processing machine 1, an image reading device 8 is provided at an upper part of a printing device 7. The printing device 7 forms an image on a medium such as a transferring paper. The image reading device 8 reads out the image from a manuscript. An operations panel P is provided at an outside surface of the image reading device 8. The operations panel P displays for an operator and accepts various inputs such as function setting by the operator.

In addition, an external media input and output device 9 is provided at a lower part of the operations panel P so that an inserting opening for receiving a storage medium M (See FIG. 3) is exposed to the outside. The storage medium M is, for example, an optical disk or flexible disk. The external media input and output device 9 reads out program code, image data, or the like stored in the storage medium M and writes the program code, the image data, or the like to the storage medium M.

As shown in FIG. 3, the digital color multifunction processing machine 1 includes an image processing unit part A and an information processing unit part B. A printing device 7 and an image reading device 8 belong to the image processing unit part A. The operations panel P and the external media input and output device 9 belong to the information processing unit part B for performing various information processes.

First, the image processing unit part A is discussed. As shown in FIG. 3, the image processing unit part A having the printing device 7 and the image reading device 8 includes the image processing control unit 10. The image processing control unit 10 implements control of the entire imaging process at the image processing unit part A. A printing control unit 11 and an image reading control unit 12 are connected to the image processing control unit 10. The printing control unit 11 controls the printing device 7. The image reading control unit 12 controls the image reading device B.

The printing control unit 11 outputs a printing order including the image data to the printing device 7 following the control of the image processing control unit 10. The printing control unit 11 makes the printing device 7 form the image on the transferring paper and output it. Full color printing can be performed by the printing device 7. As a printing method, not only an electrophotographic method but also various types of methods such as an inkjet type, a sublimation thermal transferring type, a silver photographing type, a direct thermal recoding type, or a melting thermal transferring type, can be used.

An image reading control unit 12 drives the image reading device 8 under the control of the image processing control unit 10. The image reading control unit 12 condenses a reflection light of lamp irradiation against the surface of a manuscript onto a light receiving element (for example, CCD (Charge Coupled Device)) by a mirror or lens so as to read it, and makes A/D conversion so as to generate digital image data of RGB 8 bits.

The image processing control unit 10 has a microcomputer structure where a CPU (Central Processing Unit) 13 being a main processor, an SDRAM (Synchronous Dynamic Random Access Memory) 14, a ROM (Read Only Memory) 15, and an NVRAM (Non Volatile RAM) 16 are connected by a bus. The image data read by the image reading device 8 is stored in the SDRAM 14 for a while for image forming by the printing device 7. A control program or the like is stored in the ROM 15. The NVRAM 16 can store the data even at the time of electric power loss when a system log, system setting or log information is recorded.

In addition, an HDD (magnetic disk device) 17, a LAN control part 18 and a FAX control unit 20 are connected to the image processing control unit 10. The HDD 17 is a storing device for storing a large amount of image data or job history. The LAN control part 18 connected the image processing unit part A to the LAN 2 via a HUB 19 that is a line concentrator of an internal LAN provided inside of the device. The FAX control unit 20 implements facsimile control. The FAX control unit 20 is connected to a PBX (Private Branch exchange) 22 connected to a public switched telephone network 21, so that the digital color multifunction processing machine 1 can make contact with a remote facsimile via the public switched telephone network 21.

In addition, a display control unit 23 and an operations input control unit 24 are connected to the image processing control unit 10.

The display part 23 outputs an image display control signal to the information processing unit part B via a communication cable connected to a control panel I/F (interface) 25 by control of the image processing control unit 10. The display part 23 implements control of the image display of the operations panel P of the information processing unit part B.

The operations input control unit 24 inputs an input control signal via the communication cable 26 connected to the control panel I/F 25 by the control of the image processing control unit 10. The input control signal corresponds to functional settings or input operations by the operator from the operations panel P of the information processing unit part B. In other words, the image processing unit part A directly monitors the operations panel P of the information processing unit part B via the communication cable 26.

Therefore, the image processing unit part A connects the communication cable 26 to an image processing unit which a conventional image processing device has so as to use the operations panel P of the information processing unit B. In other words, the operations input control unit 24 and the display control unit 23 of the image processing unit part A operate being connected to the operations panel P.

Under this structure, the image processing unit part A analyzes a printing order command and printing data that are image information from the outside such as the server computer 3, the client computer 4, the facsimile, or the like, so as to convert the printing data into bit-map data to be printed as the output image data. The image processing unit part A analyzes the printing data from the command and determines the operation. The image processing unit part A receives the printing data and the command from the LAN control part 18 or the FAX control unit 20 and operates on them.

In addition, the image processing unit part A can transfer the printing data, manuscript reading data, output image data made by processing these data for output, and compressed data made by compressing these data to the outside such as the server computer 3, the client computer 4, the facsimile, or the like.

Furthermore, the image processing unit part A transfers the reading data of the image reading device 8 to the image processing control unit 10, corrects signal degradation due to quantization of an optical system or a digital signal, and writes the image data in the SDRAM 14. Thus, the image data stored in the SDRAM 14 are converted to the output image data by the printing control unit 11 so as to be output to the printing device 7.

Next, the information processing unit part B having the operations panel P is discussed. As shown in FIG. 3, the information processing unit part B has a microcomputer structure where the information processing unit part B is controlled by a generic OS (Operating System) used for an information processing device generally called a personal computer. The information processing unit part B includes a CPU 31 as a main processor. A memory unit 32 and a storing device control unit 35 are connected by a bus to the CPU 31. The memory unit 32 includes a RAM that is a work area of the CPU 31 and a ROM that is exclusively a reading memory where a starting program is stored. The storing device control unit 35 controls input and output of the data to and from the storing device 34 such as an HDD storing a program or the OS.

A LAN control part 33 is connected to the CPU 31. The LAN control part 33 is a communication interface for connecting the information processing unit part B to the LAN 2 via the HUB 19. An IP address that is a network address allocated to the LAN control part 33 is different from the IP address allocated to the LAN control part 18 of the image processing unit part A. In other words, two IP addresses are allocated to the digital color multifunction processing machine 1 of the embodiment of the present invention. The image processing unit part A and the information processing unit part B are respectively connected to the LAN 2. Data conversion between the image processing unit part A and the information processing unit part B can be performed.

Since the digital color multifunction processing machine 1 is connected to the LAN 12 via the HUB 19, only a single IP address is seemingly allocated. Therefore, it is possible to easily handle connections without damaging a fine appearance.

Figure 4:
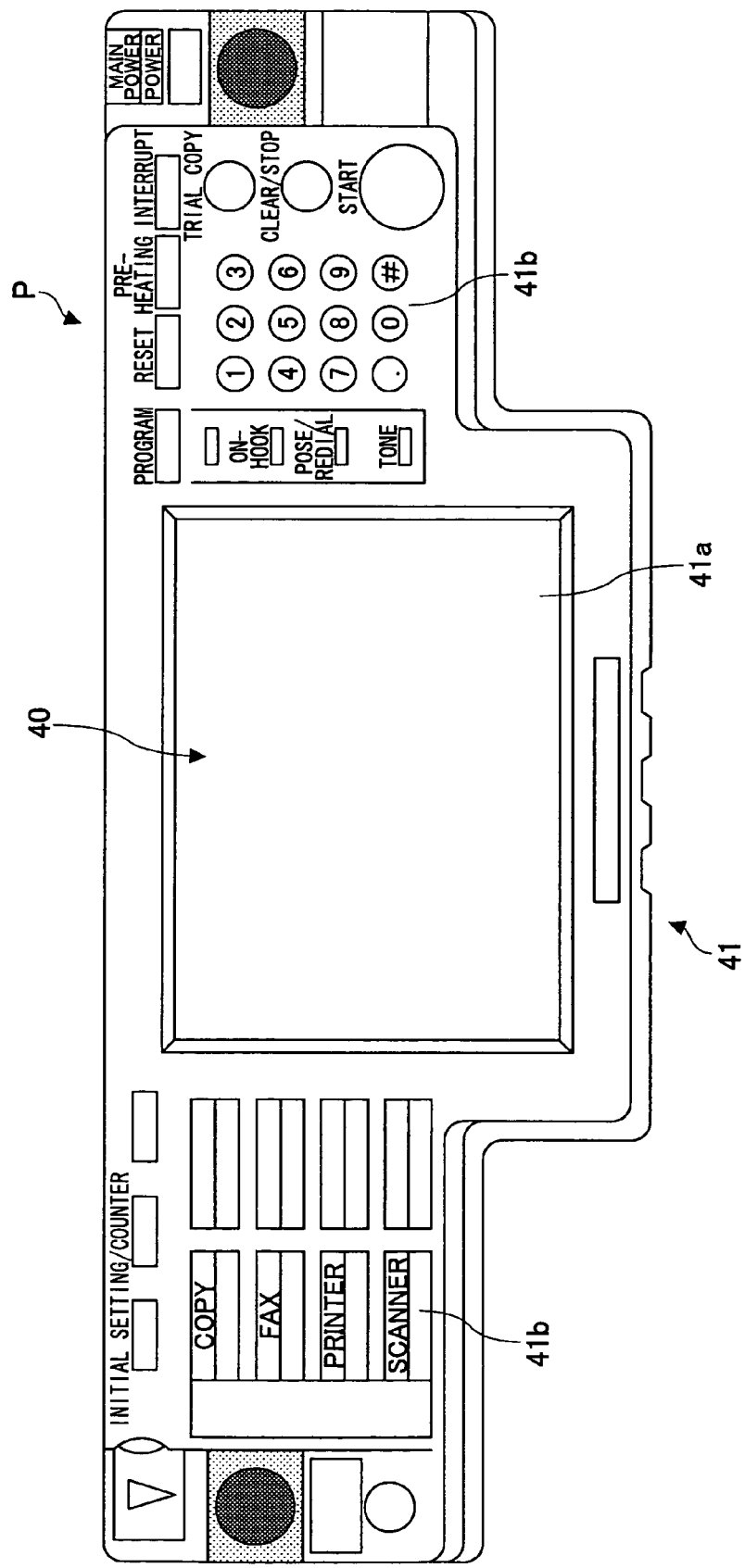
FIG. 4 is a plan view showing a structure of an operations panel.

In addition, a display control unit 36 and an operations input control unit 37 for controlling the operations panel P are connected to the CPU 31. FIG. 4 is a plan view showing a structure of the operations panel P. As shown in FIG. 4, the operations panel P includes a display device 40 and an operations input device 41. The display device 40 is, for example, LCD (Liquid Crystal Display). The operations input device 41 includes a touch panel 41a and a key board 41b. The touch panel 41a is an ultrasonic elastic wave type panel stacked on a surface of the display device 40. The key board 41b has plural keys.

A start key, ten-key, reading condition setting key, clear key, and others are provided on the key board 41b. The start key is used for starting a process such as an image reading process. The ten key is used for input a numerical value. The reading condition setting key is used for setting the address to which the read image data are sent. In other words, the display control unit 36 outputs the image display control signal to the display device 40 via the control panel I/F 38 so as to make the display device 40 display a designated item corresponding to the image display control signal. On the other hand, the operations input control unit 37 receives an input control signal via the control panel I/F 38. This input control signal corresponds to functional settings or input operations by the operator in the operations input device 41.

In addition, a control panel communication unit 39 is connected to the CPU 31. The control panel communication unit 39 is connected to the control panel I/F 25 of the image processing unit part A via the communication cable 26.

The control panel communication unit 39 receives the image display control signal output from the image processing unit part A. The control panel communication unit 39 also transfers the input control signal corresponding to the functional setting or input operations from the operations panel P by the operator, to the image processing unit part A.

As discussed below, the image display control signal from the image processing unit part A received by the control panel communication unit 39 is processed for data conversion for the display device 40 of the operations panel P and then output to the display control unit 36.

In addition, the input control signal corresponding to the functional settings or input operations from the operations panel P by the operator is converted to a format corresponding to a specification of the image processing unit part A and then input to the control panel communication unit 39.

As discussed above, the OS or program implemented by the CPU 31 is stored in the storing device 34. This means that the storing device 34 functions as a storage medium storing the program.

In the digital color multifunction processing machine 1, if the user turns on the electric power, the CPU 31 activates a starting program in the memory unit 32 so that the OS is read from the storage device 34 and written by the RAM in the memory unit 32 so that this OS is activated. Such an OS activates a program corresponding to the operation of the user and reads and stores the information. For example, Windows (Registered Trademark) and others are each known as such an OS. An operating program used for the OS is called an application program. The same type of OS used for the information processing device such as the server computer 3 or the client computer 4, namely a generic OS such as Windows (Registered Trademark) is used as the OS of the information processing unit part B.

As discussed above, the external media input and output device 9 is provided in the digital color multifunction processing machine 1. The external media input and output device 9 is a device for reading the program code or the image data stored in a storage medium M or for storing the program code or the image data in the storage medium M, such as a flexible disk drive device, an optical disk drive device, an MO drive device, or a media drive device. The storing medium M is a medium where various program code sets (control programs) such as various application programs, the device driver, or the OS is stored. The storing medium M is, for example, a flexible disk, a hard disk, an optical disk (CD-ROM, CD-R, CD-RW, DVD-ROM, DVD-RAM, DVD-R, DVD+R, DVD-RW, DVD+RW, and others), or a semiconductor medium (SD memory card (registered trademark), Compact Flash (registered trademark), Memory Stick (registered trademark), Smart Media (registered trademark), or the like). Such an external media input and output device 9 is controlled by an input and output device control unit 42 that is connected by bus to the CPU 31.

Accordingly, the application program stored in the storage device M may be installed in the storage device 34. Because of this, the storage medium M can be the storage medium storing the application program. In addition, the application program may be taken in from the outside via, for example, the Internet or LAN 2 so as to be installed in the storage device 34.

Various interfaces 43 such as USB, IEEE 1394, and SCSI are connected to the input and output device control unit 42. Hence, via the various interfaces 43, various devices such as a digital camera can be connected to the input and output device control unit 42.

Next, a specific process implemented by the digital color multifunction processing machine 1 is discussed. In the digital color multifunction processing machine 1, plural devices implementing different processes from each other, namely the image processing unit part A and the information processing unit part B in this example, can independently perform the processes. Therefore, when the image reading process is implemented by the image processing unit part A, the information processing unit part B can receive e-mail, for example. In this example, since the results of the processes do not affect each other, there is no problem in independent operations of the image processing unit part A and the information processing unit part B.

Furthermore, in the digital color multifunction processing machine 1, each of the functions of the image processing unit part A can be used by the program operated by the information processing unit part B and the result can be a subject of the processing. For example, image data of a document image read by the image reading device 8 of the image processing unit part A is character-recognition processed by a designated application program so that a text document can be obtained.

However, if the image processing unit part A and the information processing unit part B always perform the processes independently from each other, each of the functions of the image processing unit part A cannot be used by the program operated by the information processing unit part B and the result cannot be the subject of the processing. Because of this, in this example, each of the functions of the image processing unit part A cannot be used by operating the application program based on the combination of process modules.

In the image processing unit part A, a module of a control system executed by the image processing control unit 10 is formed by an application program for implementing original functions of a multifunction processing machine by the digital color multifunction processing machine 1. In the digital color multifunction processing machine 1, an interface of a functional module for a network is provided at the LAN control part 18 to which access from only the information processing unit part B via the HUB 19 (LAN 2) can be made.

Based on the functional module for the network, a function provided for a normal multifunction processing machine as a standard and implemented by the image processing control unit 10, such as the scanner function or facsimile function, can be used via the LAN 2. The function cannot be used by the image processing unit part A.

When TCP/IP (Transmission Control Protocol/Internet Protocol) detects a connection requirement for a corresponding port number, a process module of a corresponding function is activated. Here, the TCP/IP always monitors access from the LAN 2.

For example, when the connection of the port number 1002 is requested, a module of a facsimile receiving function is activated. The activated module operates based on the processing requirement from a side requesting the connection so as to reply with a necessary response.

Next, a specific feature of an application program of the information processing unit part B is discussed. A key word generation application is discussed as an example.

The keyword generation application implements the character recognition process for the image data being read so that a keyword is made from the result of the character recognition. In the entirety of the information processing unit part B, each of the application programs is executed under the management of the OS.

In addition, each of the application programs can use the functions provided by the OS. In other word, while the application program is executing the OS is used as a module of the software so that a necessary process is performed. For example, the TCP/IP control module implements a function provided in the OS as a standard, the function being used for communication with other information devices connected by the TCP/IP.

Furthermore, an independent application program installed for use by other application programs can be used. For example, an OCR engine implements only a character recognition process from the image data. Since the OCR engine does not operate individually, the OCR engine is used as a part (module) of other application programs.

Thus, since each of the application programs can be executed under the management of the OS in the entirety of the information processing unit part B, an application program having these functions can be developed.

However, in the conventional technology, the functions of the image processing unit part A and others cannot be directly used by such means.

In other words, as discussed above, in the digital color multifunction processing machine 1, the image processing unit part A for implementing the original function of the multifunction processing machine and the information processing unit part B for implementing the application programs are provided. The image processing unit part A and the information processing unit part B are connected to each other via the LAN 2 by the network protocol (TCP/IP in this example) in the digital color multifunction processing machine 1.

Since the image processing unit part A and the information processing unit part B are physically connected, it is possible to mutually communicate data between the image processing unit part A and the information processing unit part B. However, in the conventional technology, the function of the image processing unit part A cannot be used from inside of the application program executing in the information processing unit part B.

Here, means for using the function of the image processing unit part A from inside of the application program executing in the information processing unit part B are discussed.

For example, in the keyword generation application, the image data are read from the image reading device 8 managed by the image processing unit part A.

In order to instruct the image reading device 8 to perform image reading operations, it is necessary to designate the port number 1001 and request a TCP/IP connection to the image processing unit part A. At this time, data indicating the contents of the process are simultaneously sent as a data stream.

In the function designated by the port number 1001, the image reading device 8 reads the image. An optional file name is added to the image data and the image data are transferred to the information processing unit part B. The contents of such a process are determined in advance. The port number is allocated so that these functions are individually used.

Thus, the functions of the image processing unit part A can be used from the keyword generation application. The communication protocol is not limited to TCP/IP but may be other types of protocols.

The digital color multifunction processing machine 1 of the embodiment of the present invention basically has a scanner function, an image processing function, a media browser function, a document browser function, a page browser function, a form synthesizing function, a sending/storing function, a printing function, an OCR function, a searching function, a facsimile function, a mail server function, a Web server function, a periodic implementation function, a system monitoring function, a security function, a hysteresis/status display function, an individual setting function, a manager setting function, and others. Each of the functions is briefly discussed below.

In the scanner function, the paper document is read out in an image file form so as to be sent or be stored inside as an e-mail, facsimile, or a file (Windows (registered trademark) common folder, FTP folder, Web folder, outside server, or the like).

In the media browser function, files stored in respective media of a recording medium M can be read. The Windows (registered trademark) common folder on the network, FTP folder, Web folder, or the like is set as a common medium by individual setting so that it can be read by the same operation as that of the recording medium M.

In the document browser function, a group (document) of files such as stored normal documents (including a document stored for a file), received e-mail (including attached files such as images), a received facsimile, or the like can be operated on and read. In addition, the document browser function includes a document management function so that the name of the document can be changed and the document can be deleted. In the stored document, OCR characters in the image can be searched for by the OCR function discussed below and downloads from the Web can be performed.

In the page browser function, the stored document or the image read or selected for sending or printing is confirmed, so that the image in the main body can be displayed. A selection function for file sending, storing, printing, reading or editing of various information items of the file can be performed.

In the image processing function, there is an automatic image processing function whereby an image operation before sending, storing or printing can be performed. It is possible to make image quality corrections, perform rotation, reduce colors, and cut the image to and remove white paper.

In the form synthesizing function, position information (form) with a background where text or an image is provided is selected so that a new image is synthesized before being sent, stored or printed.

In the sending/storing function, an image or a file selected by the paper manuscript (scanner), the media browser, or the document browser (page browser) can be sent by mail or facsimile to a designated opponent, or a file sent to common media or outside server. In addition, as discussed above, because of storing, an OCR-processed character line can be searched for or downloading from the Web.

In the printing function, the image or the file selected by the media browser or the document browser (page browser) can be printed by designating various layouts (forms).

In the OCR function, text of the image obtained by the scanner function or received facsimile image is extracted by character recognition (OCR). The PDF file (image PDF+ OCR) where the text is provided is formed so as to be sent or stored. In the OCR function, there is an all sentences searching function of the stored document, and an OCR address or document name function used for the address or document name from the character line in the file. This OCR address is where an OCR character line of a designated region is consistent with a registered address. The OCR document name is a document name of the OCR character line of the designated region.

In the searching function, a file is extracted from the images or the file stored or existing on the common media (network) by using the document name, the file name, storing day and time, changing day and time, the OCR text (the character line where the OCR image processed is a subject) as a key word so that a file whose contents are consistent is displayed.

In the facsimile function, image information received from a facsimile communication port (such as G3-1, G3-2, G4-1 or the like) prepared by the digital color multifunction processing machine 1 is converted to the image file and the image file is divided and forwarded (e-mail forwarded or facsimile forwarded). The received facsimiles are divided based on senders by the initial setting or addresses by the receiving port. In addition, the image file from the paper document, the media document, or the stored document can be transferred by facsimile or the image attached to the received e-mail can be forwarded to another facsimile device.

In the mail server function, there are a function for sending e-mail, a function for forming and storing e-mail addresses of guests and individuals inside (at the time of SMTP (Simple Mail Transfer Protocol) setting), a function for one-touch operation of automatic printing, facsimile transferring, sending or storing an image attached to the received e-mail, and a function for sending back an operation result e-mail to the sender.

Here, several operation combinations of the received e-mail addresses are prepared for every guest or individual. The setting and change are implemented in the individual setting. In addition, e-mail addresses (at the time of POP (Post Office Protocol) receiving setting) of a single outside e-mail server are divided by the e-mail address indication name so that the same operation as the operation at the time of SMTP setting can be performed.

In order to correspond to various e-mail environments, e-mail sending corresponds to the SMTP identification and "POP before SMTP" mode. E-mail receiving corresponds to APOP (Authenticated Post Office Protocol), too.

In the Web server function, a URL is prepared for the guest and the individual, so that the image or file stored inside can be read, searched, downloaded, uploaded, sent, stored, and printed. In addition, the result of the operation can be referred to and the individual or the manager can be set. Furthermore, this function corresponds to SSL (Secure Socket Layer) sever identification in considering security during the communication.

In the periodic implementation function, deletion of storing data whose storing time passes, receiving the POP e-mail, the renewal of the LDAP (Lightweight Directory Access Protocol), automatic printing or deletion of hysteresis, and auto restarting can be done.

In the system monitoring function, disk full, abnormality generated inside of the machine, tray or door open information or paper jamming is detected so that a screen message urging the user including a service call screen is displayed. In addition, it is possible to correspond to an accounting device monitoring or limiting the use of the user.

In the security function, in order to protect data from illegal operation by an unknown user (guest user) or outside network, security (individual identification function, manager password, or the like) against the user of the operation part and security (e-mail sending identification, APOP, SSL Server identification of Web, access limitation or the like) against the network is provided.

In the hysteresis/status display function, whether the result of receiving, sending and printing of the e-mail, facsimile, or file is normal, the date and time of implementation or completion, and contents of job cancellation or errors can be confirmed.

In the individual setting function, it is possible to register the environment settings for every individual while avoiding a situation where a third party sees the user environment (registration of the address of the e-mail, customized operation and screen, received e-mail address, and others) of the individual user.

In the manager setting function, various setting function against the user, basic operating the functions (network setting, time setting automatic restarting time), and management functions (user management, e-mail environment setting, received facsimile setting) can be implemented.

Figure 5:
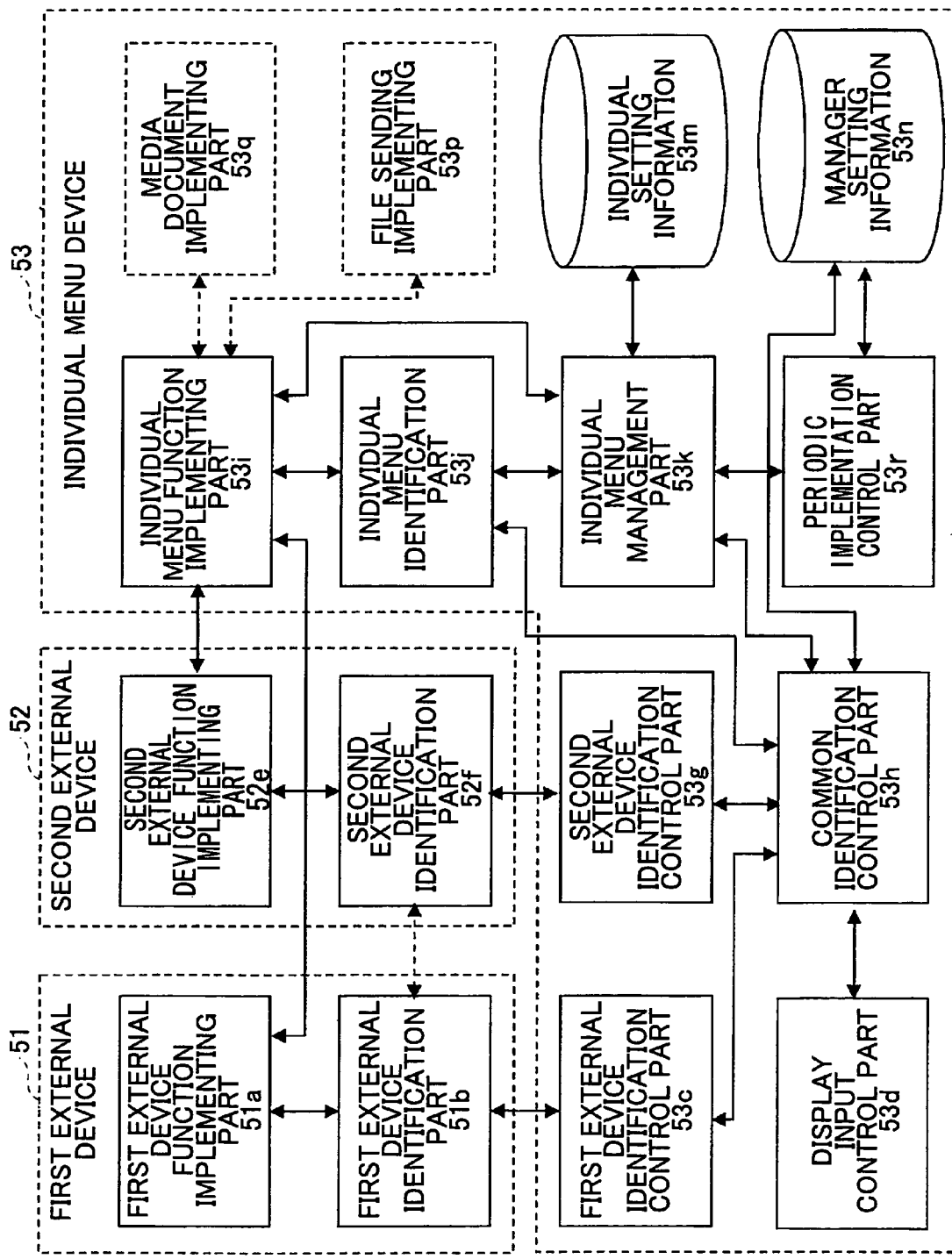
FIG. 5 is a block diagram showing a functional structure for controlling identifying action in the embodiment of the present invention.

FIG. 5 is a block diagram showing a functional structure for controlling identifying action in the embodiment of the present invention. In FIG. 5, arrows connecting blocks represent main flows of signals. This does not limit the function of each of the blocks. In addition, in FIG. 5, a first external device 51 corresponds to the server computer 3 shown in FIG. 1. A second external device 52 corresponds to the image processing unit part A shown in FIG. 3. An individual menu device 53 corresponds to the information processing unit part B shown in FIG. 3.

Figure 6:
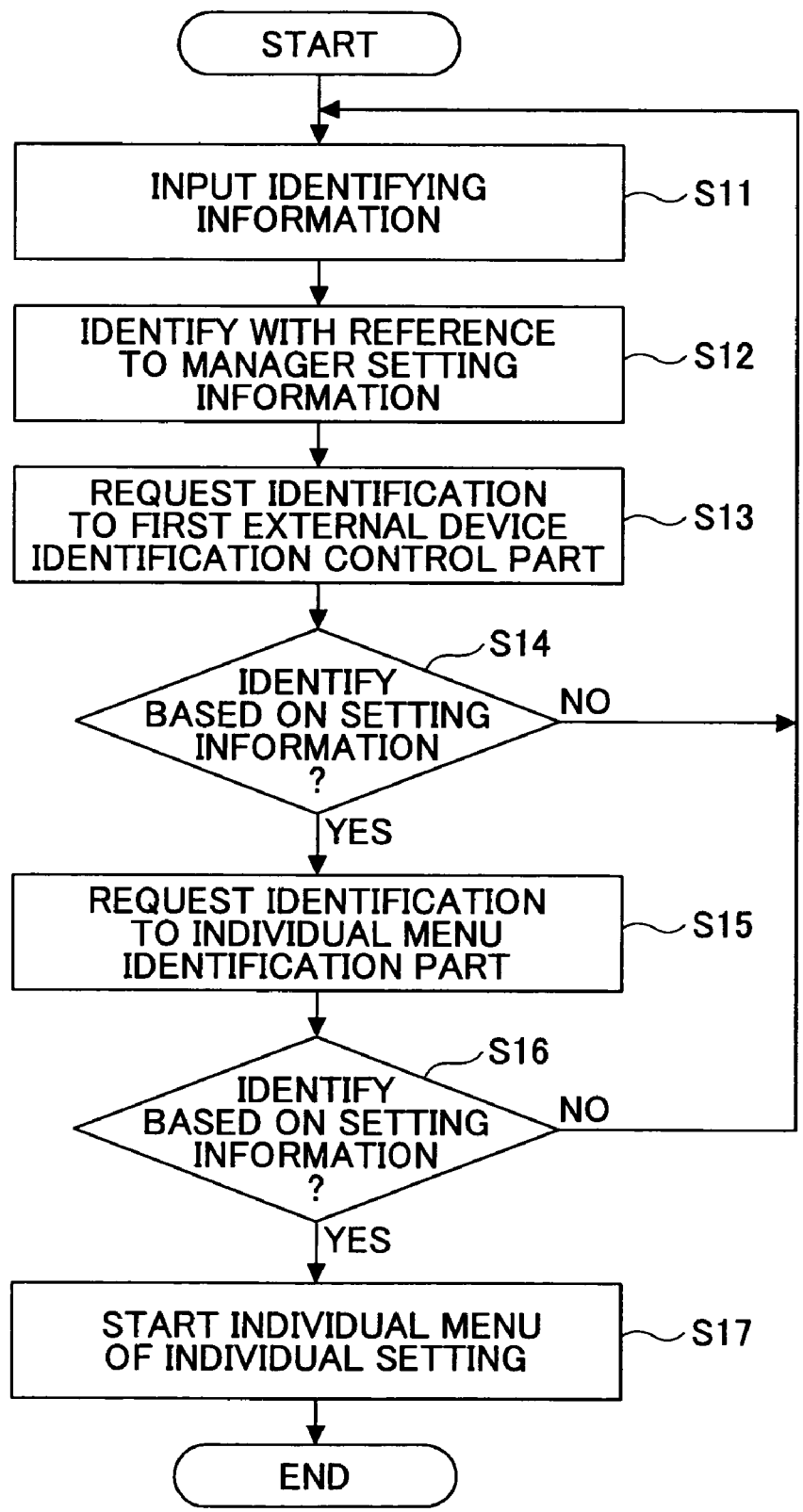
FIG. 6 is a flowchart showing an operation of identifying action of an individual menu device of the digital color multifunction processing machine of the embodiment of the present invention.

FIG. 6 is a flowchart showing an operation of identifying action of an individual menu device of the digital color multifunction processing machine of the embodiment of the present invention.

Based on the flowchart of FIG. 6, the operation in the embodiment of the present invention is discussed with reference to FIG. 5.

As an identifying action in the digital color multifunction processing machine 1 shown in FIG. 6, a display input control part 53*d* of the individual menu device 53 receives identifying information of the user (user name, password, ID card for identifying, and others) from the main picture displayed at the operations panel P (See FIG. 4), for example in step S11. The identifying information of the user is input from the input picture of the identifying information by pushing the individual identifying key.

The display input control part 53*d* transfers the input identifying information to a common identification control part 53*h*. The common identification control part 53*h* identifies the information following the setting of a manager setting information 53*n* in step S12. Here, in setting the manager setting information 53*n*, in a case where the item (1) of a management setting table shown in FIG. 7 is "EXTERNAL DEVICE IDENTIFICATION: YES", the identification is requested in order based on the setting of the item (2) of the management setting table "PRIORITY IDENTIFICATION SETTING: FIRST=FIRST EXTERNAL DEVICE, SECOND=INDIVIDUAL MENU DEVICE" in step S3.

One of "FIRST EXTERNAL DEVICE", "SECOND EXTERNAL DEVICE", and "INDIVIDUAL MENU DEVICE" is set as a first item of priority identification setting. The device which is priority identification set is indicated at the items (3) "FIRST EXTERNAL DEVICE IDENTIFICATION: YES" or (5) "SECOND EXTERNAL DEVICE IDENTIFICATION: YES".

In the case of the item (2) of the management setting table "PRIORITY IDENTIFICATION SETTING: FIRST=FIRST EXTERNAL DEVICE, SECOND=INDIVIDUAL MENU DEVICE", the common identification control part 53*h* requests, in step S13, the identification of the first external device from a first external device identification control part 53*c* by the identification information of the user input in step S11. The first external device identification control part 53*c*, in step S14, determines the identification with a first external device identification part 51*b* by an existing protocol. If this identification is not successful (NO in step S14), the identification flow of the user goes back to the beginning. If this identification is successful (YES in step S14), the common identification control part 53*h* request identification of the individual menu to a individual menu identification part 53*j* in step S5.

The individual menu management 53*k* determines, with reference to the individual setting information 53*m*, the requested identification in step S16. If the identification is successful (YES in step S16), the individual menu identification part 53*j* requests the individual menu function implementing part 53*i* to start the individual menu. If this identification is not successful (NO in step S16), the identification flow of the user goes back to the beginning.

The individual menu function implementing part 53*i* obtains the individual setting information 53*m* via the individual menu management part 53*k* so as to start the individual menu at the individual setting in step S17. Thus, the identification flow to the individual menu device 53 is implemented as discussed above. At this time, since the identification of the first external device identification part 51b is successful, the function of a first external device function implementing part 51a can be used from the individual menu of the individual menu function implementing part 53i.

Figure 9:
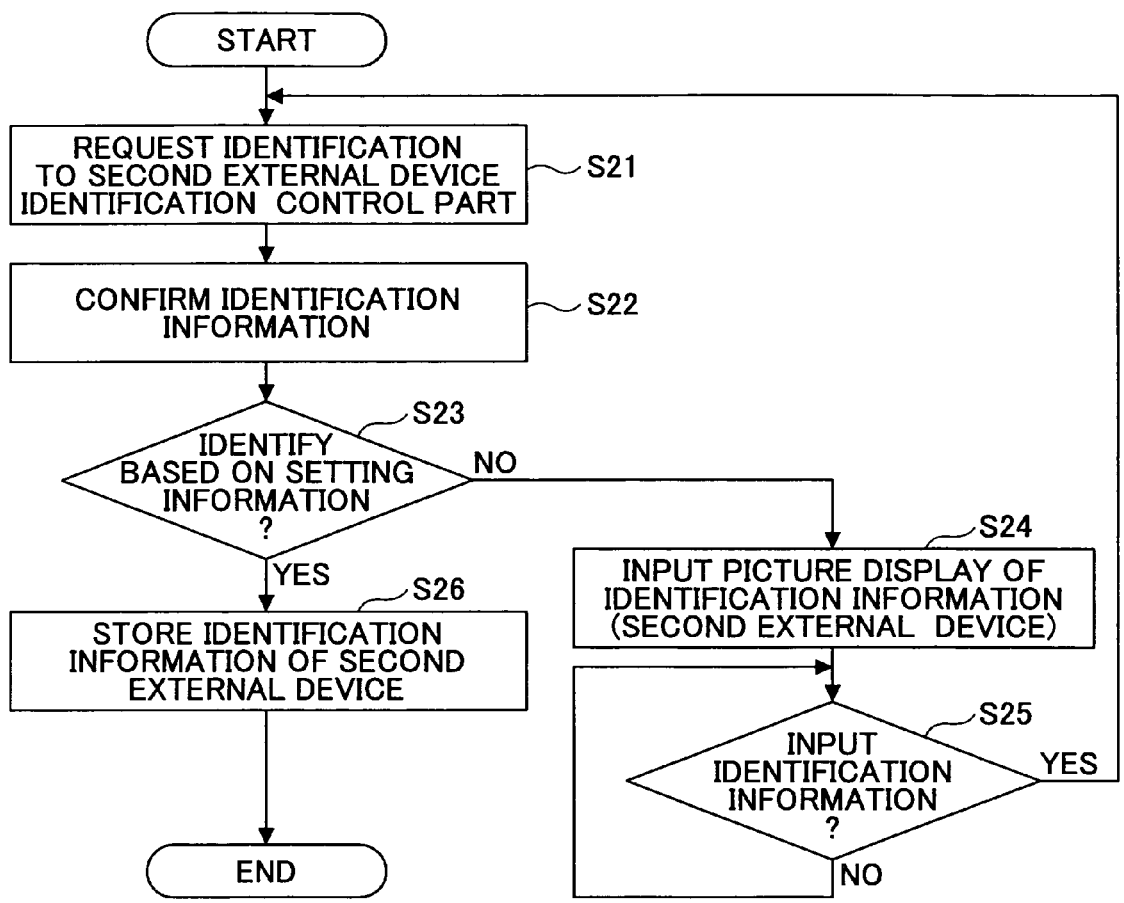
FIG. 9 is a flowchart showing an operation of identifying action of a second external device after the first external device and the individual menu device are identified, of the embodiment of the present invention.

Meanwhile, FIG. 9 is a flowchart showing an operation of additional identifying action of the second external device after the first external device and the individual menu device are identified.

Referring to FIG. 9, at the same time as starting the individual menu or corresponding to the request for using the function of the second external device, the common identification control part 53h requests the identification of the second external device from the second external device identification control part 53g in step S21 so that the second external device identification control part 53g implements identification with a second external device identification part 52f. At this time, the common identification control part 53h confirms so as to obtain "SECOND EXTERNAL DEVICE IDENTIFICATION INFORMATION" of the item (6) of the individual setting table shown in FIG. 8 in step S22. This "SECOND EXTERNAL DEVICE IDENTIFICATION INFORMATION" of the item (6) of the individual setting table shown in FIG. 8 is the individual setting information 53m of the individual menu identified via the individual menu management part 53k. Here, the existence of registration of the identifying information or whether the information is the input identification information is confirmed.

In step S22, if the identification information is not registered at "SECOND EXTERNAL DEVICE IDENTIFICATION INFORMATION" of the item (6) of the individual setting table shown in FIG. 8, since the identifying process with the first external device is already completed, the identification information identified by the first external device is used. If the identification information is registered at "SECOND EXTERNAL DEVICE IDENTIFICATION INFORMATION" of the item (6) of the individual setting table shown in FIG. 8, the identification information is obtained and the second external device identification control part 53g implements identification with the second external device identification part 52f in step S23. If this identification is successful (YES in step S23), the individual menu function implementing part 53i can use the function of a second external device function implementing part 52e.

If this identification is not successful (NO in step S23), the common identification control part 53h displays an input dialog on the display input control part 53d again in step S24. This is displayed on a picture as the function of the second external device function implementing part 52e from the individual menu function implementing part 53i. Implementation of the function of the individual menu function implementing part 53i or the first external device function implementing part 51a is not obstructed.

If the user inputs correct identification information to the input dialog (display picture in step S13) (YES in step S25) the common identification control part 53h requests the second external device identification control part 53g to implement the identification with the second external device identification part 52f again in step S21. If the input identification information is confirmed in step S22 and determination of the identification based on this identification information is successful (YES in step S23), the common identification control part 53h stores, via the individual menu management part 53k, correct identification information in "SECOND EXTERNAL DEVICE IDENTIFICATION INFORMATION" of the item (6) of the individual setting information 53m shown in FIG. 8 in step S26. This correct identification information is used next time when the second external device identification control part 53g implements the identification with the second external device identification part 52f.

As a result of this, in a case where "SECOND EXTERNAL DEVICE IDENTIFICATION INFORMATION" of the item (6) of the individual setting table shown in FIG. 8 is not registered, the identification flow fails only the first time. However, in the identification flow after the second time, the stored information can be used. If the first external device is designated as the subject of the priority identification, the identification flow is completed by only the first external device and the individual menu device. The second external device implements the identification when the function of the second external device function implementing part 52e is used in the individual menu. Because of this, if the user registration of the first external device is identical with user registration of the individual menu, the identification flow is successful. The second external device may identify when the function is required.

By the identification action discussed above, it is possible to use functions of various devices connected to the network and the digital color multifunction processing machine 1.

As a stored document handled by the digital color multifunction processing machine 1 shown in FIG. 3, there is a general document processed by the OCR reading function of the image reading device 8 and stored in a state so that a search can be made for all of the sentences. In addition, there is a received facsimile document which is received via the public switched telephone network (PSTN) 21 and the FAX control unit 20, the document not being printed out (paperless function), being stored by the PCR process or vertical and horizontal rotation process, and being sent by e-mail sent, e-mail file attachment, or forwarded by facsimile (dividing by using the CSI (Called Station Identification) or RTO (Receiver Terminal Identification) by the facsimile function.

In addition, there is a received e-mail document forwarded by the other facsimile device or a printed out e-mail or attached file received via the LAN 2 by the e-mail server function. In addition, there is a document in a non-sending tray where data are processed based on a sending instruction but are stored because sending has failed. Hundred of thousands of documents as map data are divided by administrative classifications and stored.

Figure 10:
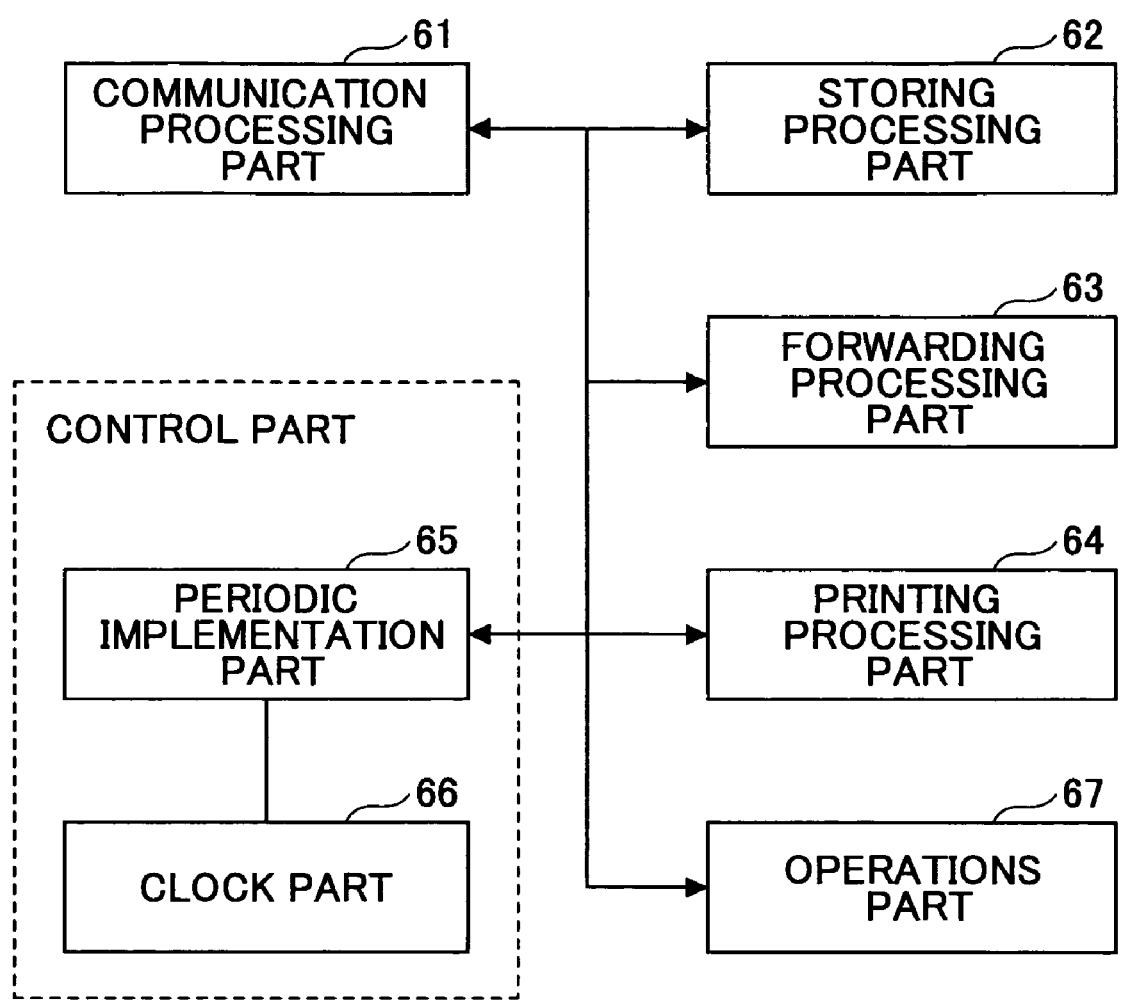
FIG. 10 is a block diagram showing a function structure whereby a received document process is implemented.
Figure 11:
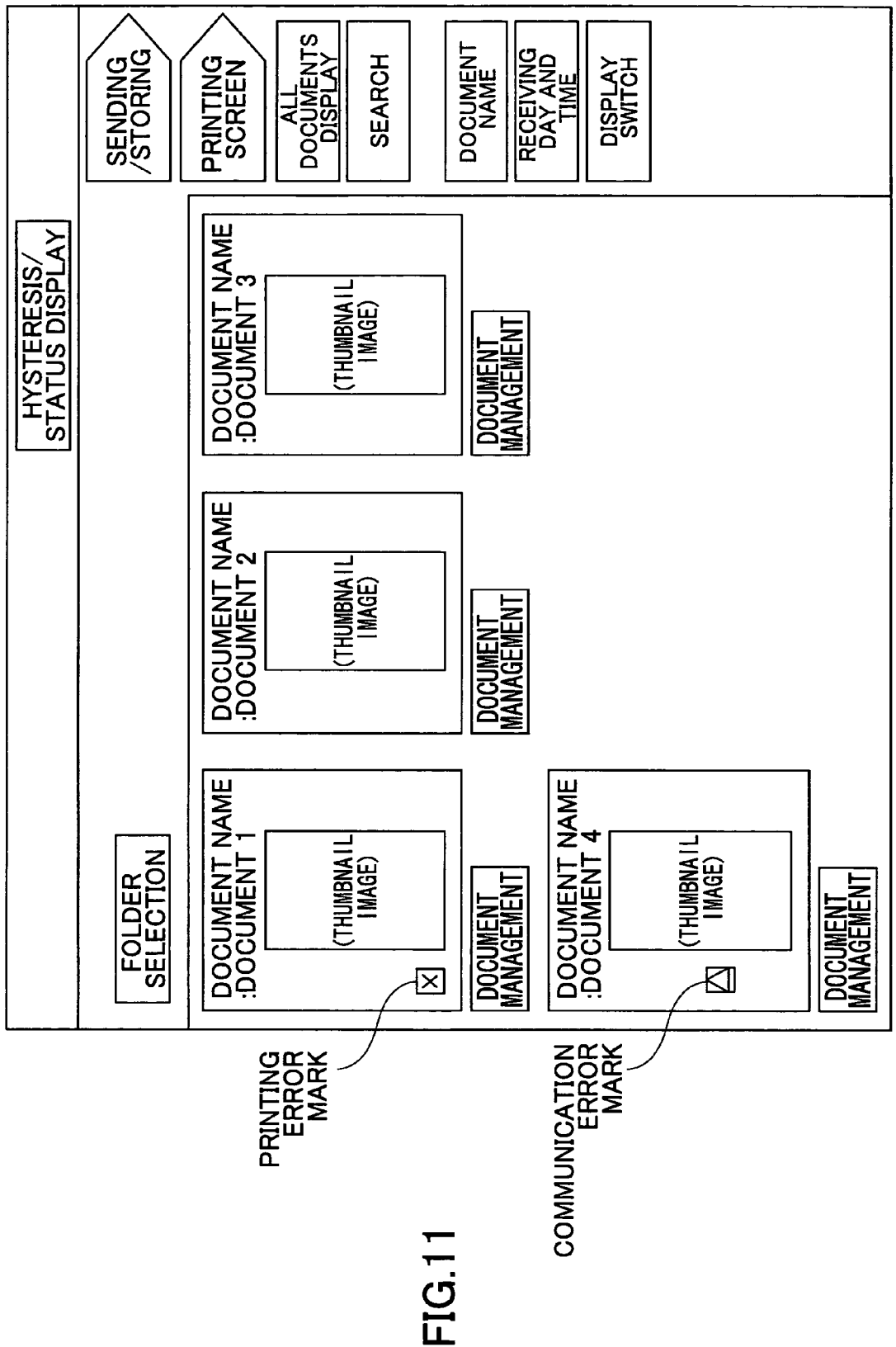
FIG. 11 is a view of an error mark display screen displayed at the displaying device.

FIG. 10 is a block diagram showing a functional structure whereby a received document process is implemented. In FIG. 10, arrows connecting blocks represent main flows of signals. This does not limit the function of each of the blocks.

Referring to FIG. 10, the functional structure whereby the received document process is implemented includes a communication processing part 61, a storing processing part 62, a forwarding processing part 63, a printing processing part 64, a periodic implementation part 65, and an operations part 67.

The communication processing part 61 receives a document file via a network or a public switched telephone network (PSTN). The storing processing part 62 stores the received document file in the storing part. The forwarding processing part 63 forwards the received or stored document file to another device. The printing processing part 64 prints the received or stored document file. The periodic implementation part 65 controls the processing parts based on the corresponding management information by a time notification being output from a clock part 66. The clock part 66 counts the day and time by using a basic clock in the device. The operations part 67 performs setting of the management information or inputting for a process in a lump.

The document file of the e-mail or the facsimile received by the communication processing part 61 is sent to one or more of the storing processing part 62, the forwarding processing part 63, and the printing processing part 64 so that the processes are performed.

The storing processing part 62 performs a storing process of a document after the process for searching all sentences by the sending/storing function or the OCR function is completed. The forwarding processing part 63 performs a forwarding process of the received document or the stored document by the sending/storing function, facsimile function, mail server function, or the like. The printing process part 64 performs the printing process for paper printing by the printing function, the image processing function, or the like. The periodic implementation part 65 performs the processes of the document file based on the management information in addition to the periodic implementation function or the searching function.

By using these functions, the document file received by facsimile from the information device is formed as e-mail and sent via the network, so that the e-mail can be printed out by the digital color multifunctional machine 1 receiving the e-mail. In addition, this can be sent to another facsimile device via this digital color multifunctional machine 1 by facsimile forwarding.

The periodic implementation part 65 sets an opponent to be forwarded as management information for the forwarding process. As a result of this, if the address of the e-mail or the OCR address of the facsimile corresponding to the document file received by the communication processing part 61 is detected by the storing processing part 62, the periodic implementation part 65 controls the forwarding processing part 63 based on the management information so as to forward it to a designated forwarding address.

In addition, by the browser function or the Web server function, the stored document can be read, and all sentences searched or downloaded by an identified general user, a manager, or a guest user to whom optional functional limitations are given by the manager. Furthermore, as corresponding to kinds of the stored documents, by the security function, there can be limitations for reading the document by using a password or the like. In addition, as for handling the received facsimile document, since it is sent and printed out for the convenience of the sender, the general user cannot handle it and only the manager can handle it.

In the related art, printing the received facsimile document can be stopped. However, in the example of the present invention, the process setting of the management information is performed based on the time notification from the clock part 66 at the periodic implementation part 65 and a schedule control for implementing or stopping the printing process at a designated time is performed. As a result of this, the received facsimile document is not printed in an office room having no person left, so that the security of the received facsimile document can be provided.

As the management information implemented by the periodic implementation part 65, a schedule of whether the subject document in the stored document is to be printed is et by using day and time, a day of the week, national holiday, starting and ending time, combination of them or a long designated period that the user desires such as a summer vacation. Based on this, a designated process is implemented. For example, the received facsimile document is printed in only a working time period of a week day (from 9 a.m. to 6 p.m.) and not printed but instead stored on Saturday, Sunday, national holidays and night times. In addition, at the designated printable time, the periodic implementation part 65 searches the document file having no printed mark at the storing process part 62. A printing output is directed by the printing processing part 64 so that the printing output process is started.

In addition, if a current printing process or a future process is at the set ending time, the printing process can be forcible stopped. Setting of the day and time, day of the week, and the time for schedule controlling of the management information can be changed via the network by the operations panel P, the browser function, or the Web server function.

Not only the printing control based on the management information of the periodic implementation part 65 but also the printing control based on the direct instruction from the specific user (manager) can be done. The document file stored in the storing processing part 62 is managed by the database, folders for the document files are divided as e-mail and facsimile, and the document file is managed and stored at the facsimile for every receiving port. By storing the document file, for example, an output of sending error is made when the forwarded document file is not sent in error by the forwarding processing part 63. When the received document file is printed by the facsimile, reprinting can be made even if a problem such as no paper in stock occurs.

In addition, in the stored document file, as well as the mark provided after the condition is decided by the hysteresis/condition display state, another mark is provided as hysteresis of the process of the document file in the document file in the stored document at the storing processing part 62. This mark indicates completion of the printing of the document file, sending error, and stopping of the printing.

The instruction for providing this mark is sent to the storing processing part 62 at the time of generation of a sending error at the transferring processing part 63 in the case of a sending error, or is sent to the storing processing part 62 at the time of generation of a printing error at the printing processing part 63 in the case of printing error. The document file name and the marks are registered as the data base of the stored document file and can be searched at the storing processing part 62.

Figure 12:
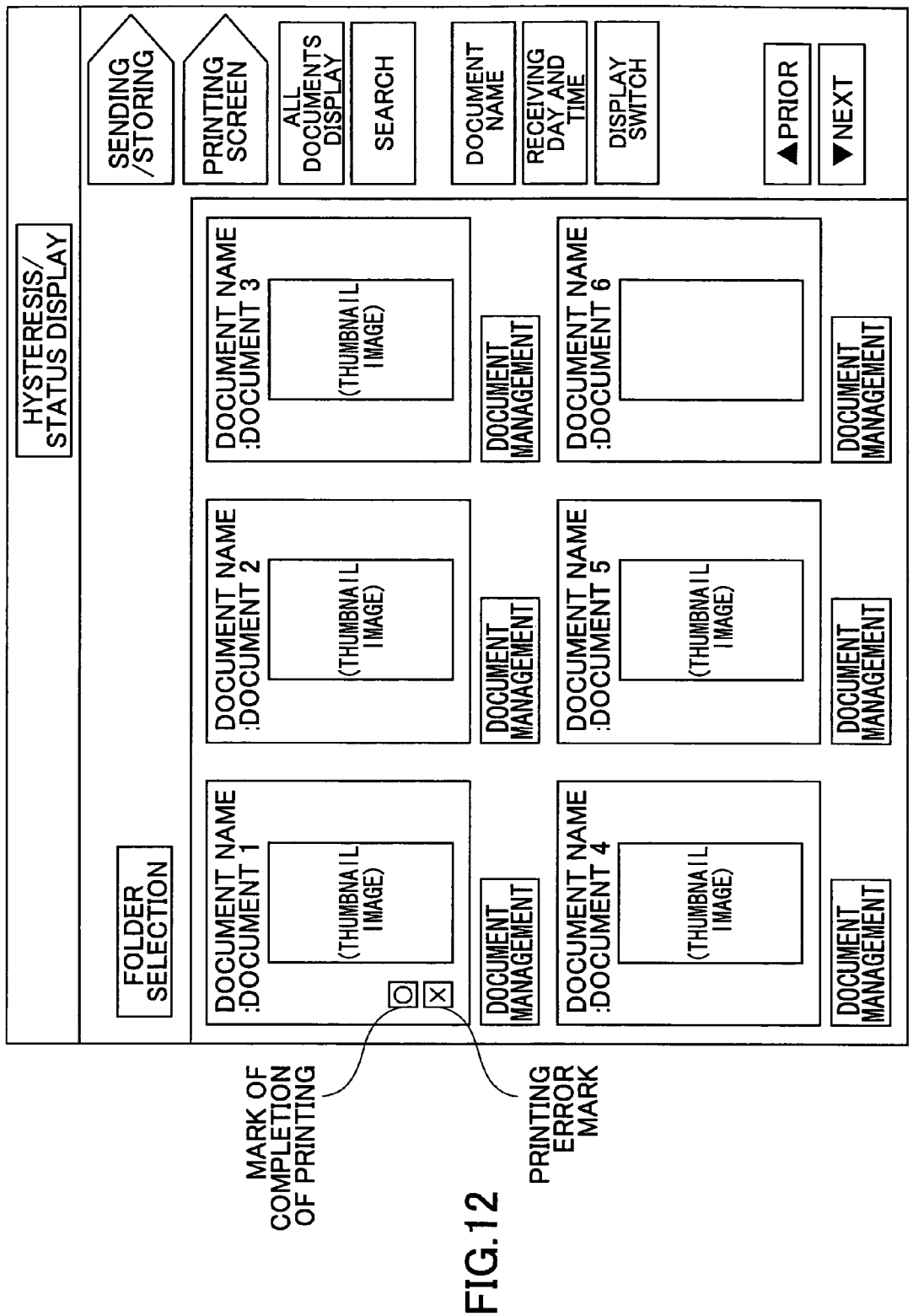
FIG. 12 is a view of a print finishing mark display screen displayed at the displaying device.

This mark is displayed at an error mark displaying screen (See FIG. 11) of a sending error or printing error or printed mark displaying screen (See FIG. 12) for every thumbnail. The user sees this screen so as to determine the sending error, printing error, and the printed document file. The corresponding document file can be searched at the storing processing part 62 based on the instruction of the operations part 67 such as the operations panel P, and the document file is printed by the printing processing part 64 so as to implement the process for reprinting or deleting.

However, in a case where the number of received facsimile documents is large, selecting the document file individually and controlling the process generates a high work load. In addition, the device for a specific use such as the digital color multifunctional machine has a small display part of the display device and the number of the documents that can be displayed is limited. Therefore, for example, the searching by the storing processing part 62 is made based on the printed mark so that deletion in a lump can be performed. The document file not having the printed mark of the received facsimile document is searched for by the storing processing part 62 so as to be sent to the printing processing part 64 for printing in a lump. After printing these documents in a lump, it is possible to delete them in a lump.

Figure 13:
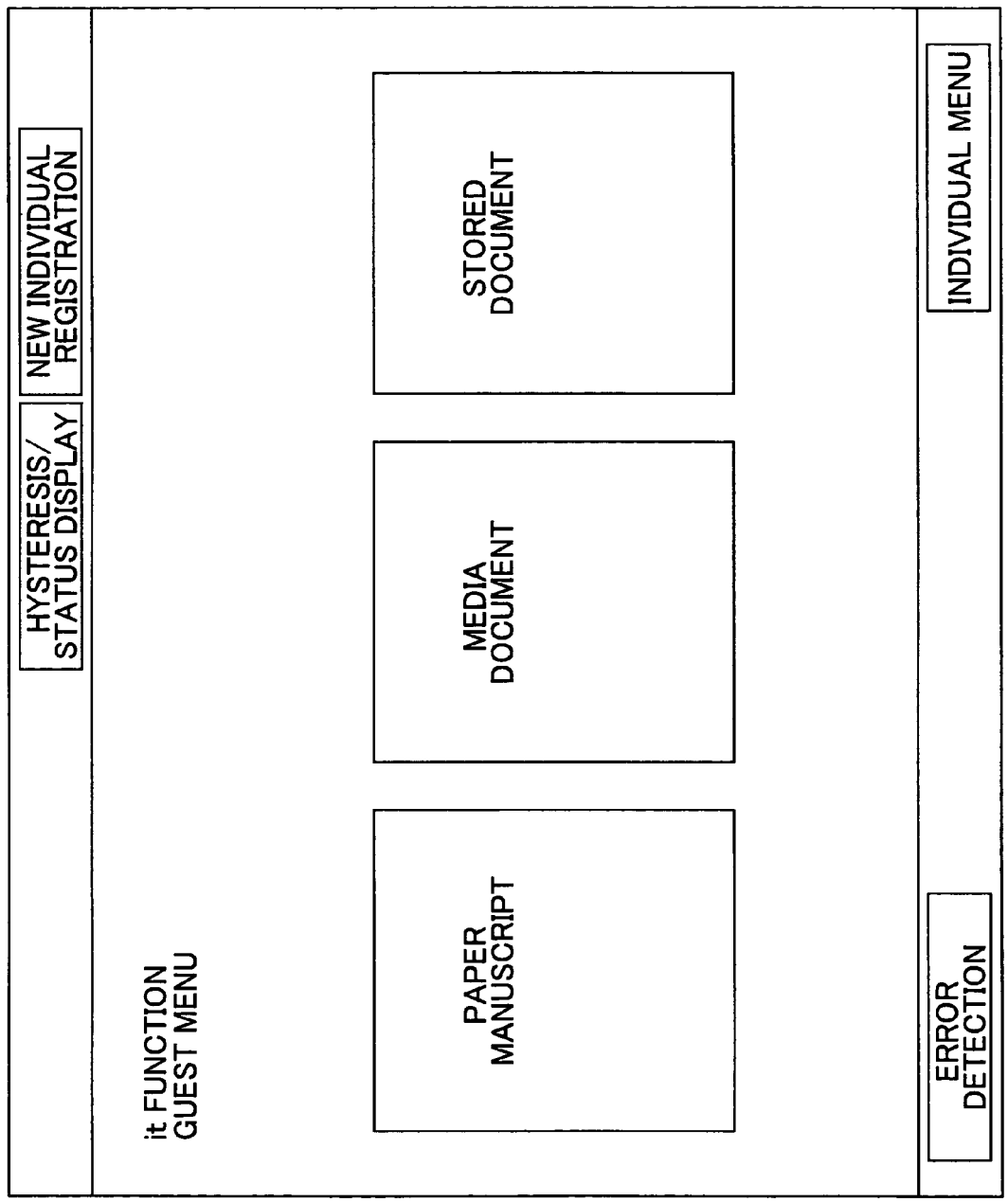
FIG. 13 is a view of a main screen indicating "error detection" displayed at the displaying device.
Figure 14:
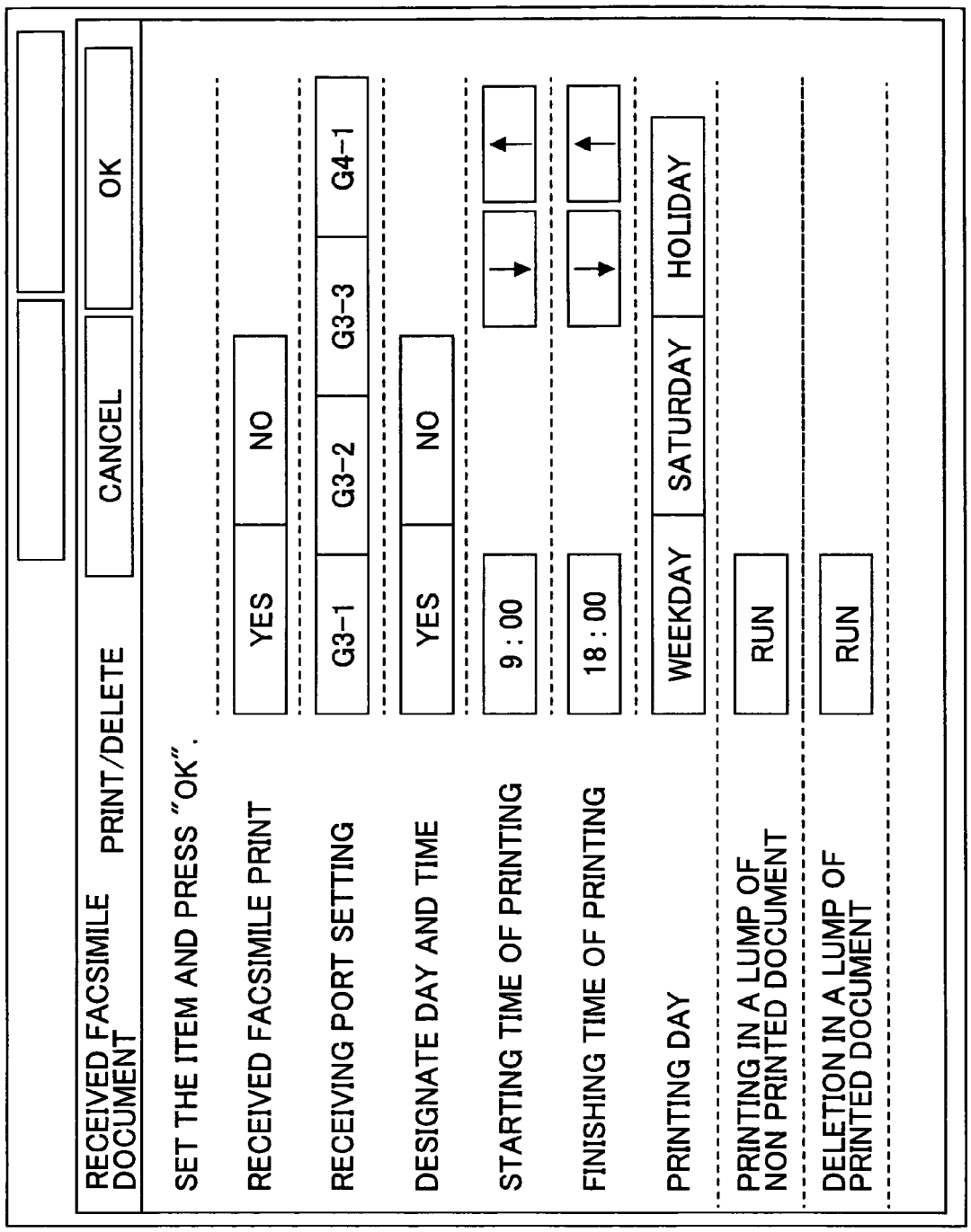
FIG. 14 is a setting screen of a received facsimile document for printing/deleting, as viewed at the displaying device.

In a case where the error occurs in the stored document, as shown in FIG. 13 of the main screen at the time of activating the device, "error detection" is indicated. In addition, the above-mentioned process is implemented by pushing "RUN" of "PRINTING IN A LUMP OF NON PRINTED DOCU- MENTS" or "DELETION IN A LUMP OF PRINTED DOCUMENTS" indicated at the setting screen of "RECEIVED FACSIMILE DOCUMENT PRINTING/DELETING".

As a result of this, the received facsimile document is not printed and left in the office room after the working time or on holidays, so that security can be provided and a process of a stored facsimile document can be easily performed.

In the received document input and output device of the embodiment of the present invention, the document file received via the communication part connected to the network is forwarded or printed based on the management information of the periodic implementation part so that the document file can be efficiently used. In addition, the schedule is managed so that the printing of the facsimile document is not performed and security can be provided. The received document input and output device is connected to the network, uses the communication protocol, and communicates the documents in various data forms with plural information devices.

The present invention is not limited to these embodiments, but variations and modifications may be made without departing from the scope of the present invention.

This patent application is based on Japanese Priority Patent Application No. 2005-251289 filed on Aug. 31, 2005, the entire contents of which are hereby incorporated by reference.

What is claimed is:

1. An input and output device, comprising:
a communication part configured to receive documents via a network;
a storing part configured to store the documents received via the communication part;
a printing part configured to print the documents;
a setting part configured to set management information;
a clock part configured to count day and time;
a periodic implementation part configured to control at least the communication part, the storing part and the printing part based on the set management information and a time notification indicating the counted day and time outputted from the clock part, the periodic implementation part controlling the printing part to not print the stored documents received from the communication part until a designated period specified by the set management information; and
a display screen configured to display a print error mark in proximity to a displayed thumbnail image of a stored document if an error occurs with printing the stored document, the display screen configured to display a print mark in proximity to the displayed thumbnail image of the stored document if the stored document is printed, wherein the stored document is one of the stored documents; and
a forwarding part configured to forward the stored document to a designated address based on the set management information so that the stored document is forwarded, wherein the display screen is configured to display a forwarding error mark in proximity to the displayed thumbnail image of the stored document if an error occurs when forwarding the stored document.

2. The input and output device as claimed in claim 1; wherein the designated period of the set management information is a term from one of day and time, a day of the week, a national holiday, and starting and ending time.

3. The input and output device as claimed in claim 1; wherein the designated period of the set management information is a term that a user selects.

4. The input and output device as claimed in claim 1; wherein the documents stored in the storing part can be read or downloaded from a Web browser by an identified user.

5. The input and output device as claimed in claim 1; wherein the documents are received via e-mail or facsimile.

6. The input and output device as claimed in claim 5; wherein, in the documents received via the facsimile, the documents stored in the storing part but not printed are printed in a lump based on whether the stored documents have the printed mark.

7. The input and output device as claimed in claim 5; wherein, in the documents received via the facsimile, the documents stored in the storing part and printed are then deleted in a lump based on whether the stored documents have the printed mark.

8. An input and output device, comprising
communication means for receiving documents via a network;
storing means for storing the documents received via the communication means;
printing means for printing the documents;
setting means for setting management information;
clock means for counting day and time;
periodic implementation means for controlling at least the communication means, the storing means and the printing means based on the set management information and a time notification indicating the counted day and time outputted from the clock means, the periodic implementation means controlling the printing means to not print the stored documents received from the communication means until a designated period specified by the set management information; and
display means for displaying a print error mark in proximity to a displayed thumbnail image of a stored document if an error occurs with printing the stored document, the display means for displaying a print mark in proximity to the displayed thumbnail image of the stored document if the stored document is printed, wherein the stored document is one of the stored documents; and
forwarding means for forwarding the stored document to a designated address based on the set management information so that the stored document is forwarded, wherein the display means displays a forwarding error mark in proximity to the displayed thumbnail image of the stored document if an error occurs when forwarding the stored document.

9. An inputting and outputting method of received documents, comprising the steps of:
receiving documents via a network;
storing the received documents;
printing the documents;
setting management information;
counting day and time;
controlling the receiving step, the storing step and the printing step based on the set management information and a time notification indicating the counted day and time, the controlling step controlling the printing step to not print the stored documents received by the receiving step until a designated period specified by the set management information;
displaying a print error mark in proximity to a displayed thumbnail image of a stored document if an error occurs with printing the stored document, wherein the stored document is one of the stored documents;

displaying a print mark in proximity to the displayed thumbnail image of the stored document if the stored document is printed;

forwarding the stored document to a designated address based on the set management information; and displaying a forwarding error mark in proximity to the displayed thumbnail image of the stored document if an error occurs when forwarding the stored document.

10. The inputting and outputting method of the received document as claimed in claim 9;

wherein the designated period of the set management information is a term from one of day and time, a day of the week, a national holiday, or starting and ending time.

11. The inputting and outputting method of the received document as claimed in claim 9;

wherein the designated period of the set management information is a term that a user selects.

12. The inputting and outputting method of the received document as claimed in claim 9;

wherein the stored documents can be read or downloaded from a Web browser by an identified user.

13. The inputting and outputting method of the received document as claimed in claim 9;

wherein the documents are received via an e-mail or facsimile.

14. The inputting and outputting method of the received documents as claimed in claim 13;

wherein, in the documents received via the facsimile, the documents stored but not printed are printed in a lump based on whether the stored documents have the printed mark.

15. The inputting and outputting method of the received documents as claimed in claim 13;

wherein, in the documents received via the facsimile, the documents stored and printed are then deleted in a lump based on whether the stored documents have the printed mark.

16. The input and output device of claim 1, further comprising:

an individual menu function implementing part configured to register individual setting information for each of a plurality of authorized users.

17. The input and output device of claim 1, wherein the communication part receives at least one document via facsimile, and the forwarding part forwards the at least one document to a device via email and forwards the at least one document to another device via facsimile.

* * * * *